(12) United States Patent
Fujimoto

(10) Patent No.: US 7,246,900 B2
(45) Date of Patent: Jul. 24, 2007

(54) SHOCK-ABSORBING MECHANISM FOR SPECTACLES

(75) Inventor: Shigeyuki Fujimoto, Sabae (JP)

(73) Assignee: Try-Angle Co., Ltd., Fukui-shi (JP)

( * ) Notice: Subject to any disclaimer, the term of this patent is extended or adjusted under 35 U.S.C. 154(b) by 63 days.

(21) Appl. No.: 11/267,252

(22) Filed: Nov. 7, 2005

(65) Prior Publication Data

US 2006/0114407 A1    Jun. 1, 2006

(30) Foreign Application Priority Data

Nov. 29, 2004   (JP)   ............................. 2004-343802

(51) Int. Cl.
*G02C 5/16* (2006.01)
(52) U.S. Cl. .................. 351/113; 351/114; 351/119
(58) Field of Classification Search ........ 351/111–123, 351/158, 41; 16/228
See application file for complete search history.

(56) References Cited

U.S. PATENT DOCUMENTS 6,000,797 A * 12/1999 Ichihashi et al. ........... 351/156

FOREIGN PATENT DOCUMENTS

JP    2000-321539    11/2000

* cited by examiner

*Primary Examiner*—Huy Mai
(74) *Attorney, Agent, or Firm*—Snider & Associates; Ronald R. Snider

(57) ABSTRACT

An endpiece (E) is composed by disposing a pair of elastic inner and outer wiring or plating parts in juxtaposition. An outer part external member (1) is adopted to keep a shape and structure of the endpiece (E) intact and reinforced. The inner part is a buffer piece (2) doubled back into a hairpin shape and has at least a first bending portion (21) of convex shape and a second bending portion (22) of concave shape. When a temple (T) is unfolded to excess, the first and second bending portions (21) and (22) flexibly bend towards a direction to which those portions expand so as to counterbalance stress to which the external member (1) is subjected.

2 Claims, 2 Drawing Sheets

SHOCK-ABSORBING MECHANISM FOR SPECTACLES

RELATED APPLICATION

This application claims the priority of Japanese Patent Application No. 2004-343802 filed on Nov. 29, 2004, which application is incorporated herein by reference.

BACKGROUND OF THE INVENTION

1. Technical Field

The present invention relates to an improvement on a pair of spectacles, in more details, pertaining to a shock-absorbing mechanism for spectacles intended to protect a wearer's head or face from being inadvertently subjected to an external force, which mechanism permits such force to be equally conveyed to the respective inner and outer elastic parts arranged in juxtaposition comprising an endpiece, for instance, whereby stress concentrated on one of those parts of the endpiece is dispersed to the other thereof so that such force to which the spectacles as a whole are subjected can be efficiently absorbed, with the result that higher safety on the part of the wearers is secured.

2. Prior Art

Conventionally, by way of one example, such an endpiece as having an elastic recovery function is disclosed in the Japanese Patent Laid-open Application No. 2000-321539 especially at pages 3 to 4 and in reference to FIGS. 2 through 5 thereof, in order to absorb an external force to which a wearer is inadvertently subjected or to make it comfortable to wear with his/her head snugly supported by such elastic function during use of the spectacles.

However, such coil spring arrangement as adopted for the endpiece of the above prior disclosure is inconvenient to use and unsatisfactory with the users in that hairs are clipped in interstices between the respective windings of such coil.

Thus, in the case where an endpiece is formed of inner and outer elastic parts disposed in juxtaposition in an attempt to complexly form such endpiece, only one of those parts is vulnerable to larger compression force or tensile force upon such endpiece being subjected to certain external force, which causes imbalance in stress applied between those parts, so that repetitive application of such imbalanced stress to one of those parts is likely to arise durability problems at large due to difference in a degree of fatigue between those parts.

DISCLOSURE OF THE INVENTION

In view of the foregoing unresolved issues with the prior art, the present invention is to provide a shock-absorbing mechanism for spectacles intended to protect a wearer's head or face from being inadvertently subjected to an external force, which mechanism permits such force to be equally conveyed to the respective inner and outer elastic parts arranged in juxtaposition comprising an endpiece, for instance, whereby stress concentrated on one of those parts of the endpiece is dispersed to the other thereof so that such force to which the spectacles as a whole are subjected can be efficiently absorbed, with the result that higher safety on the part of the wearers is secured.

The means adopted herein to solve the above issues are described below with reference to the accompanying drawings.

That is to say, the present invention is characterized in that with an endpiece (E) that is disposed extensibly from the respective sides of a spectacles front and to a free end of which a temple (T) is connectable, the endpiece (E) is composed by a pair of inner and outer parts formed of an elastic wiring or plating material being disposed in juxtaposition, for which outer part an external member (1) bent archly is adopted to keep a shape and structure of the endpiece (E) intact and reinforced and for which inner part a buffer piece (2) bent in a hairpin shape and comprising at least a first bending portion (21) of convex shape and a second bending portion (22) of concave shape is adopted, and upon the temple (T) being unfolded in excess the first bending portion (21) and the second bending portion (22) flexibly bend towards a direction to which those portions (21) and (22) expand so as to counterbalance stress to which the external member (1) is subjected whereas upon the temple (T) being folded in excess the first bending portion (21) and the second bending portion (22) flexibly bend towards a direction to which those portions (21) and (22) contract so as to counterbalance stress to which the external member (1) is subjected, thereby, counterbalancing a difference in stress applied and that in expansion or contraction effected between the external member (1) and the buffer piece (2) so as to absorb an external force to which the spectacles are subjected.

Further, in order to solve the above issues, in addition to the above means, where appropriate, the present invention is characterized in that a proximal end portion (31a) of a pad arm (31) made of an elastic material comprising a nose pad (3) is provided extensibly from a lower fringe portion of a rim (R) towards a central side of the spectacles front so as to absorb an external force applied to the lower fringe portion thereof from below.

BEST MODE FOR CARRYING OUT THE INVENTION

Figure 1:
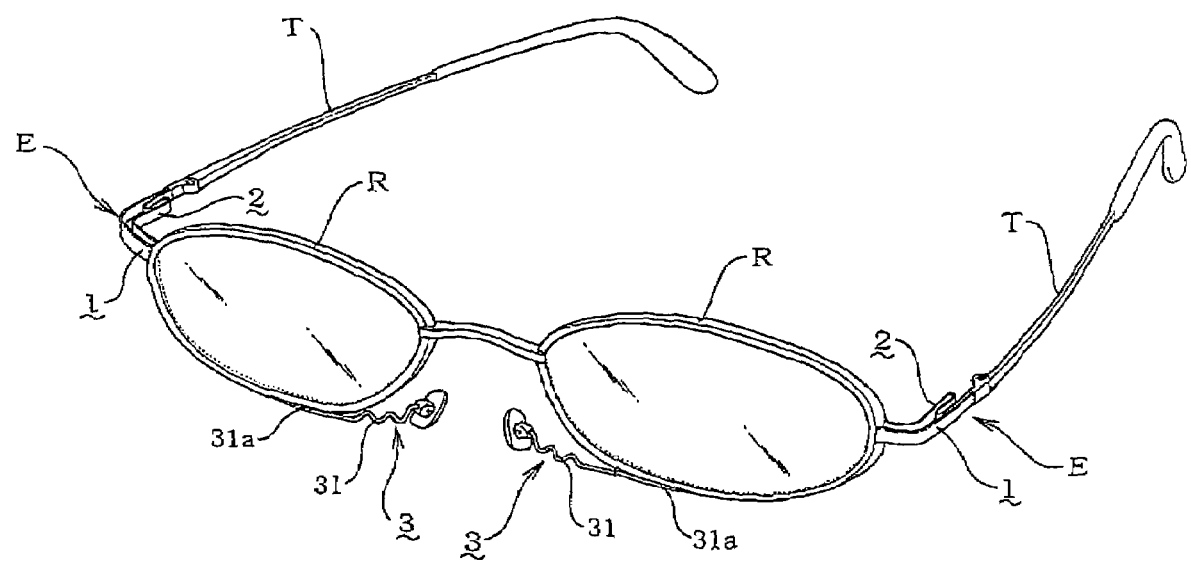
FIG. 1 is the whole perspective view of the spectacles embodied in the invention.

The preferred embodiment to carry out the invention is described below in details with reference to the accompanying drawings.

The embodiment of the invention is explained as follows in reference to FIGS. 1 through 4. In the drawings, reference numeral (1) indicates an external member bent archly, which member is formed of an elastic wiring or plating material (made from β-titanium herein) and reference numeral (2) indicates a buffer piece doubled back in a hairpin shape, which piece comprises at least a first bending portion (21) and a second bending portion (22).

In this embodiment, with an endpiece (E) that is provided extensibley from the respective sides of a spectacles front and to a free end of which a temple (T) is connectable, this endpiece (E) is composed by a pair of inner and outer wiring or plating parts made from an elastic material being disposed in juxtaposition.

Figure 2:
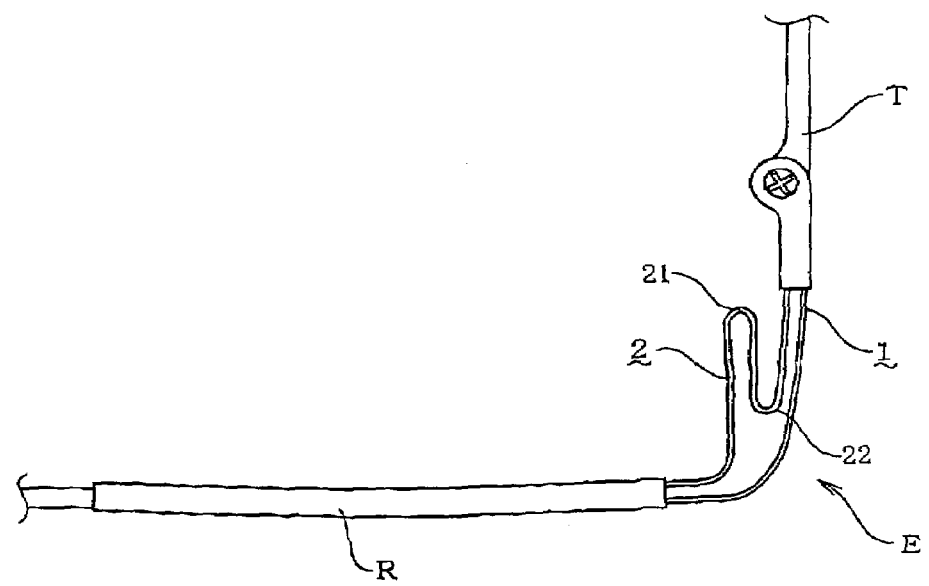
FIG. 2 is a fragmentary plan view showing the structural mechanism of the spectacles embodied in the invention.
Figure 3:
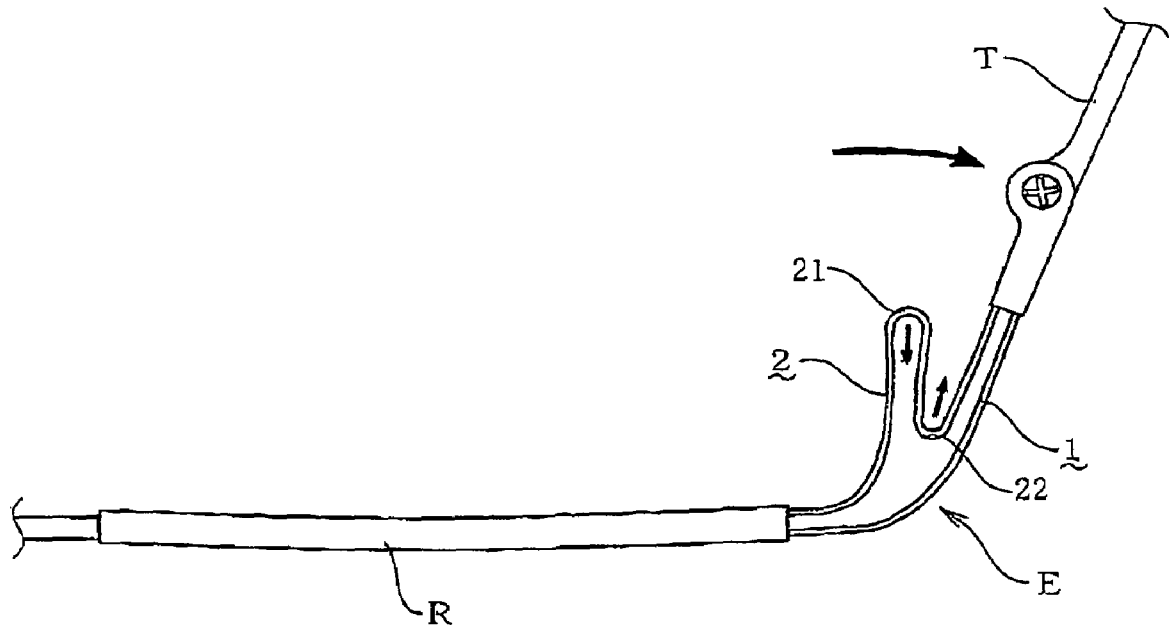
FIG. 3 is a fragmentary plan view showing the structural mechanism of the spectacles embodied in the invention.
Figure 4:
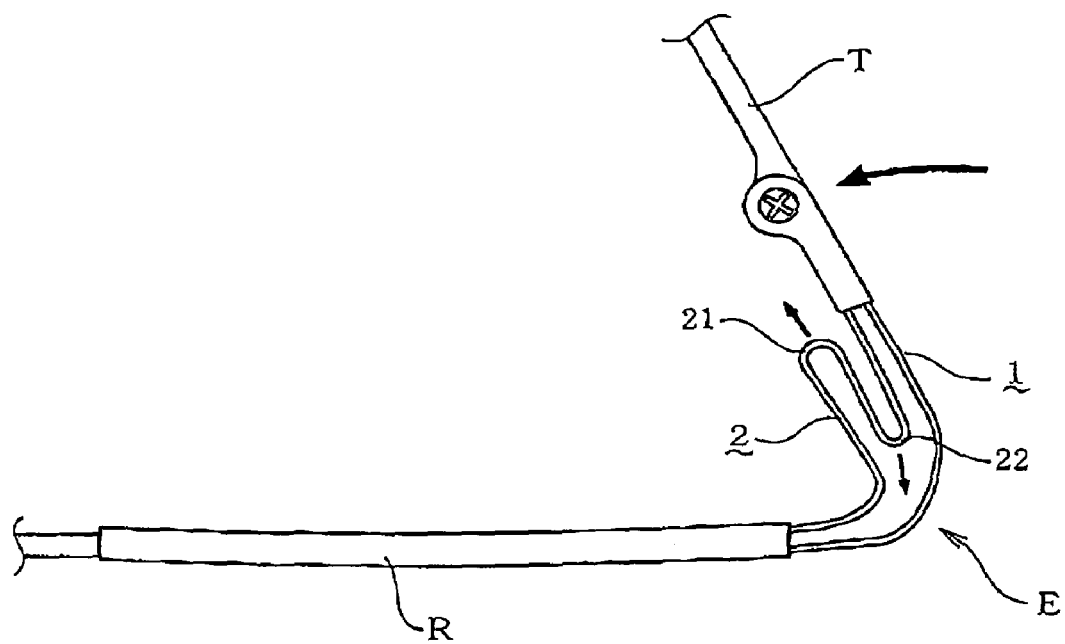
FIG. 4 is a fragmentary plan view showing the structural mechanism of the spectacles according to the invention.

Specifically, as shown in FIG. 2, for such outer wiring or plating part, the external member (1) bent archly is adopted to keep a shape and structure of the endpiece (E) intact and reinforced while for such inner wiring or plating part, the buffer piece (2) bent in a hairpin shape comprising the first and second bending portions (21) and (22) respectively is adopted.

Then, upon the temple (T) being unfolded in excess, the first and second bending portions (21) and (22) of the buffer piece (2) subjected to larger tensile force than the external member (1) flexibly bend towards a direction to which those portions expand (to the direction indicated with arrows in FIG. 3) so as to counterbalance stress to which the external member (1) is subjected.

On the other hand, upon the temple (T) being folded to excess, the first and second bending portions (21) and (22) of the buffer piece (2) subjected to larger compression force than the external member (1) flexibly bend towards a direction to which those portions contract (to the direction indicated with arrows in FIG. 4) so as to counterbalance stress to which the external member (1) is subjected. Thereby, difference in stress applied and in expansion and contraction effected between the inner and outer members of the endpiece (E) is counterbalanced so as to absorb an external force to which the spectacles as a whole is subjected.

It should be noted herein that not only an external force can be absorbed by means of the structural mechanism of the endpiece (E) as mentioned above, but also such force applied from below to the lower fringe side of a rim (R) can be absorbed by providing a proximal end portion (31a) of a pad arm (31) made of an elastic material comprising a nose pad (3) extensibly from the lower fringe side thereof towards the central side of the spectacles front, which pad arm may be molded into a coiled springy form.

The invention having been substantially described heretofore, it is not limited to the above embodiment exemplified in the attached drawings, but can be modified into various manners within the scope of the accompanying patent claims. For instance, the bent portions of the buffer piece (2) may be modified, provided that they take a hairpin shape so as to effectively disperse stress between them to which the external member is subjected.

Further, the external member (1) and the buffer piece (2) may be made from such elastic metal as a super elastic alloy essentially consisting of nickel and titanium and the like as well as such elastic materials as a higher elastic resinous material, any of which modifications belongs to the technical scope of the invention.

According to the shock-absorbing mechanism for spectacles embodied in the invention wherein an endpiece is composed by disposing a pair of elastic inner and outer wiring or plating parts in juxtaposition, for which outer part the external member bent archly is adopted to keep a shape and structure of the endpiece intact and reinforced while for which inner part the buffer piece bent in a hairpin shape comprising at least the first bending portion of convex shape and the second bending portion of concave shape is adopted, an external force applied to the endpiece is equally conveyed to the inner and outer parts thereof, thereby, stress concentrated on one of those parts being dispersed to the other.

Accordingly, upon the temple being unfolded or folded in excess, stress to which the external member is subjected is counterbalanced by the first and second bending portions of the buffer piece flexibly bending so as to counterbalance difference in stress applied and that in expansion and contraction effected between the external member and the buffer piece, thereby, an external force to which the endpiece is subjected being absorbed, which allows damage on the spectacles to remarkably reduce and a wearer to protect his/her face or head from being inadvertently subjected to an external force during use of the spectacles leading to higher safety on the part of the users, so that the industrial applicability of the spectacles incorporating the shock-absorbing mechanism according to the invention is high.

What is claimed is:

1. Shock-absorbing mechanism for spectacles wherein an endpiece (E) that is provided extensibley from respective sides of a spectacles front and to a free end of which a temple (T) is connectable is composed by disposing a pair of inner and outer parts made from one of elastic wiring and plating materials in juxtaposition, for said outer part an external member (1) bent archly being adopted to keep a shape and structure of said endpiece (E) intact and reinforced whereas for said inner part a buffer piece (2) doubled back into a hairpin shape and comprising at least a first bending portion (21) of convex shape and a second bending portion (22) of concave shape being adopted, and upon said temple (T) being unfolded in excess, said first bending portion (21) and said second bending portion (22) flexibly bend towards a direction to which said portions (21) and (22) expand so as to counterbalance stress to which said external member (1) is subjected while upon said temple (T) being folded to excess said first bending portion (21) and said second bending portion (22) flexibly bend towards a direction to which said portions (21) and (22) contract so as to counterbalance stress to which said external member (1) is subjected, thereby, difference in stress applied and that in expansion and contraction effected between said external member (1) and said buffer piece (2) being counterbalanced so as to absorb an external force to which said spectacles are subjected.

2. Shock-absorbing mechanism for spectacles according to claim 1 wherein a proximal end portion (31a) of a pad arm (31) made from an elastic material comprising a nose pad (3) is provided extensibly from a lower fringe side of a rim (R) towards a central side of said spectacles front so as to absorb said external force applied from below to said lower fringe side.

* * * * *